United States Patent Office 3,736,195
Patented May 29, 1973

3,736,195
GELLED HYDRAZINE CONTAINING
ROCKET FUEL
George W. Burdette, China Lake, Calif., assignor to the United States of America as represented by the Secretary of the Navy
No Drawing. Filed Feb. 11, 1966, Ser. No. 527,382
Int. Cl. C06b 15/00, 15/04
U.S. Cl. 149—36        2 Claims The invention described herein may be manufactured and used by or for the Government of the United States of America for governmental purposes without the payment of any royalties thereon or therefor.

The present invention relates to an improved high energy gelled fuel and its method of preparation; more particularly to a gelled fuel of the amine type which is useable at temperatures ranging from −65° F. to +165° F.

At present there is a dearth of gelled fuels for rockets which are stable at temperatures as low as −65° F. Inorganic materials such as silicon dioxide and carbon black have been used for gelling some liquid rocket fuels. Generally, these gels are not mechanically stable and exhibit the undesirable feature of syneresis. Organic materials such as guar gum, gum arabic, gum tragacanth, karaya gum, methyl cellulose and sodium alginate have been used, but are either unstable at high temperatures or too viscous to use at low temperatures. The present invention provides an improved thioxtropic or pseudoplastic amine fuel which is useable over a wide temperature range and exhibits no syneresis.

It is therefore an object of the present invention to provide a high energy gelled fuel which is simple and inexpensive to prepare and which maintains its chemical and physical properties at temperatures ranging from −65° F. to +165° F.

Another object is to provide a fuel with a gel structure which will hold particulate additives in uniform suspension throughout thereby improving the boost performance values of the fuel.

Yet another object is to provide a fuel which is safe, and easy to handle, and if spilled will not spread into crevices and holes.

A further object is to provide a fuel which has smaller surface area and will thereby decrease fire hazards.

Other objects, features and many of the attendant advantages of this invention will become better understood by reference to the following description.

In accordance with the present invention the foregoing objects are accomplished with an improved gelled amine fuel formulation comprising a minor portion of colloidal silicon dioxide and hydroxyethylcellulose and a major portion of hydrazine or a mixture of monomethylhydrazine and hydrazine, or related amines and their mixtures.

The following examples illustrate a specific embodiment of the invention but it is to be understood that the particular system illustrated should not be construed as a limitation of the scope of the invention:

EXAMPLE I

A mixture containing 86% methyl hydrazine and 14% hydrazine was prepared. To 92.5% by weight of this mixture 6% by weight colloidal silicon dioxide ($SiO_2$) and 1.5% hydroxyethylcellulose (HEC) were blended and stirred for one hour. Flow tests were conducted with gallon quantities of this formulation, passing it through tubing and orifices over a temperature range of −65° F. to +165° F. The material performed satisfactorily. The gel also proved mechanically stable. Samples were centrifuged at 6600 $g$'s for 30 minutes without separation or settling. Other samples were subjected to simulated vibration for 33 hours at +165° F. with a maximum $g$ force of 45 without showing degradation or settling. Aluminum powder added to this formulation in amounts varying from 50 to 60% by weight performed satisfactorily under similar conditions. The gel structure holds particulate additives such as aluminum and zirconium powder in uniform suspension.

EXAMPLE II

Hydrazine was gelled with the same quantity of silicon dioxide and hydroxyethylcellulose. This formulation (92.5% hydrazine, 6% silicon dioxide, and 1.5% hydroxyethylcellulose) also performed over a wide temperature range between −65° F. to +165° F.

These gels possess the ability to keep high density and high energy insoluble particles such as aluminum and zirconium stably suspended. Additives of this nature boost the performance values of fuels. The outstanding feature of this gel is its utility at −65° F. No crosslinking agents are required for this system which eliminates the possibility of unwanted increases in gel strength due to slow ionization of the crosslinking agent. Many gels using crosslinkers exhibit changing properties from day to day. Using silicon dioxide without hydroxyethylcellulose results in gels which are mechanically unstable to high "$g$" forces and at −65° F. exhibit the undesirable feature of syneresis. Therefore, the use of hydroxyethylcellulose with the silicon dioxide is critical to this invention.

Obviously many modifications and variations of the present invention are possible in the light of the above teachings. It is therefore to be understood that within the scope of the appended claims the invention may be practiced otherwise than as specifically described.

What is claimed is:

1. A gelled rocket fuel formulation which is stable at temperatures ranging from −65° F. to +165° F. consisting essentially of 92.5% by weight of a fuel composed of a mixture of monomethylhydrazine and hydrazine, 6% by weight silicon dioxide and 1.5% by weight hydroxyethylcellulose.

2. The formulation of claim 1 wherein the fuel is hydrazine.

References Cited
UNITED STATES PATENTS
3,116,187  12/1963  Scanlon et al.  _____ 149—36
FOREIGN PATENTS
978,105  12/1964  Great Britain.

LELAND A. SEBASTIAN, Primary Examiner

U.S. Cl. X.R.
149—2, 17, 44